Patented Nov. 17, 1953

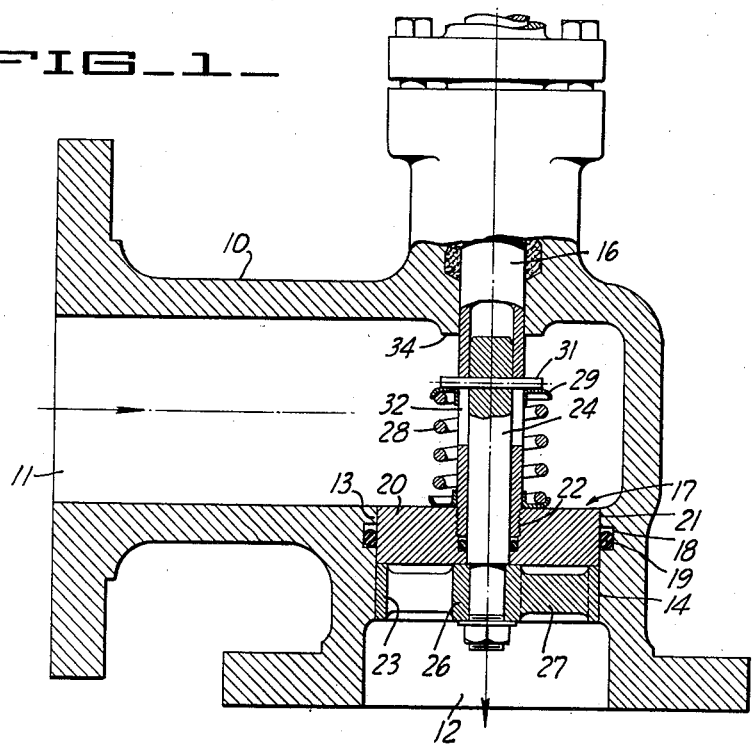
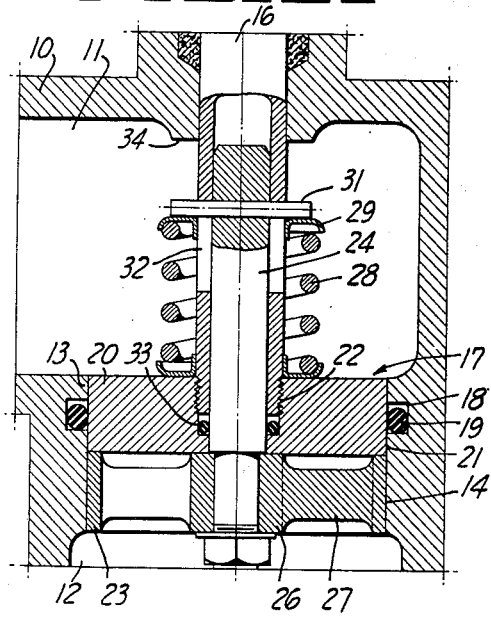
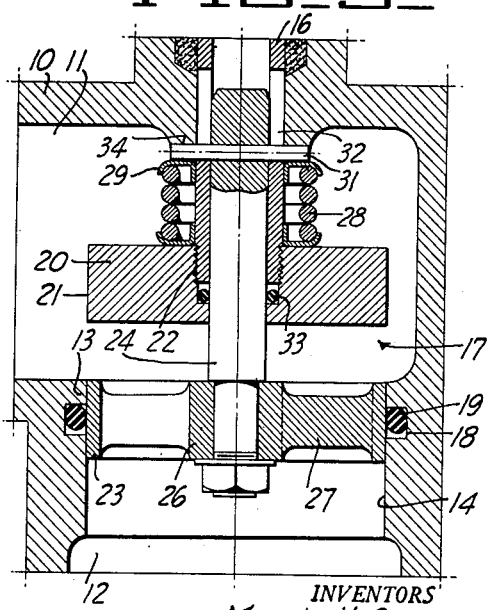
INVENTORS
Marvin H. Grove
Austin U. Bryant

2,659,568

UNITED STATES PATENT OFFICE 2,659,568

VALVE CONSTRUCTION

Marvin H. Grove, Piedmont, and Austin U. Bryant, Berkeley, Calif., assignors, by mesne assignments, to Grove Regulator Company, Oakland, Calif., a corporation of California Original application May 15, 1948, Serial No. 27,308. Divided and this application October 9, 1951, Serial No. 250,419

3 Claims. (Cl. 251—27)

This invention relates generally to valves of the type utilizing a valve member movable between open and closed positions for controlling flow of fluid.

Conventional globe and similar types of flow control valves employ a valve member adapted to be moved rectilinearly in opposite directions between open and closed positions with respect to a stationary annular valve seat. Metal to metal valve working surfaces are commonly employed, although one or more of the valve parts, as for example the stationary seat, may be made of or faced with non-metallic material such as resilient rubber. It is characteristic of such valves that a substantial amount of force must be exerted between the valve member and its cooperating seat, to maintain a substantially sealed relationship. This tends to cause deterioration of the valve working surfaces, particularly when excessive forces are employed, as is common in the manual operation of such valves. Also with such valves it is difficult to maintain a bubble tight seal. This is particularly true where metal surfaces are employed.

In our copending application Serial No. 27,308 filed May 15, 1948, of which this application is a division, there is disclosed a valve making use of sealing means of the resilient O ring type, which is arranged to establish a bubble tight seal between the stationary seat and the movable valve member, for closed position of the valve. Such a valve has the property of establishing a bubble tight seal without application of excessive closing force. As set forth in said copending application, a valve of this kind involves the problem of preventing dislodgment of the resilient O ring by fluid flow, particularly when the valve is used on fluid systems involving relatively high fluid pressures. This is because the resilient O ring is loosely accommodated within a retaining groove, and is therefore susceptible to ready dislodgment.

It is an object of the present invention to provide an improved valve making use of sealing means of the O ring type and which will prevent dislodgment of the resilient O ring or rings employed.

Another object of the invention is to provide an improved valve of the above character having novel guard means which moves automatically between seal ring protecting and out-of-the-way positions, in response to movement of the valve member between full open and closed positions.

Additional objects of the invention will appear from the following description in which the preferred embodiment has been set forth in detail in conjunction with the accompanying drawing.

Referring to the drawing:

Figure 1 is a side elevational view in section illustrating a valve incorporating the present invention.

Figure 2 is an enlarged cross-sectional detail illustrating the working parts of the valve of Figure 1, and with the parts in closed position of the valve.

Figure 3 is a cross-sectional detail like Figure 2 but with the parts in open position.

The valve illustrated in Figure 1 is of the manual operated type and consists of a body 10 having inflow and outflow passages 11 and 12, which are adapted to be connected to associated piping. An annular seat member 13 is formed within the body, either integral therewith or as a separate member. This member has a cylindrical bore 14 therethrough which forms a throat orifice for flow of fluid when the valve is open. An operating stem 16 extends into the valve body in alignment with the bore 14. Suitable means (not shown) can be connected to the exterior end of this valve stem for moving the same rectilinearly and to position the valve assembly as desired. Suitable sealing or packing gland means (not shown) can be provided to prevent leakage between the stem and the body. The inner end of the stem 16 carries a valve assembly 17 which cooperates with the seat 13.

The inner cylindrical periphery of the seat 13 is interrupted by the annular groove 18, and this groove serves to loosely accommodate the resilient seal ring 19. Preferably this seal ring is of the O ring type, having a circular cross-sectional contour. It can be formed of a suitable "elastomer," such as synthetic rubber.

The valve assembly 17 includes the valve member 20, which in this instance is a simple plunger having a cylindrical periphery 21. It is suitably attached to the inner end of the stem 16, as by means of the threaded engagement 22. The diameter of the valve member 20 is slightly less than the diameter of the bore 14, whereby a snug sliding fit is established. Adjacent one side of the valve member 20, and preferably on that side remote from the stem, there is an annular guard member or ring 23, which has an outer cylindrical periphery formed to the same diameter as the diameter of the valve member.

As means for mounting the guard member 23 with respect to the valve member, a rod 24 slidably extends through the hollow stem 16, and its one end (remote from the stem) carries the hub 26, which in turn is attached to the ring 23 by the webs 27. Thus the ring 23 is at all times aligned with respect to the valve member 20, but is free to move toward or away from the same.

Spring means is provided to normally urge the guard ring 23 toward and against one side of the valve member. Thus a compression spring 28 surrounds the stem 16. One end of this spring acts against the valve member, and the other end seats upon a washer 29, which in turn engages the pin 31. This pin extends through the adjacent end portion of the rod 24, and is accommodated within slots 32 which are formed in the adjacent portion of the stem 16.

Suitable means such as the resilient O ring 33 serves to establish a seal between the rod 24 and the valve member 20. When the valve member is moved toward full open position, pin 31 engages a shoulder 34 formed on the valve body, and this serves to limit further movement of the pin and the parts directly associated with the same, namely, the rod 24, and the guard ring 23.

Operation of the valve described above is as follows: Full closed position of the valve assembly is shown in Figures 1 and 2. The dimensioning of the resilient O ring is such that this ring is normally compressed in a radial direction whereby it establishes a fluid tight seal between the valve member and the seat 13. As the valve is moved toward open position the valve member 20 is retracted from engagement with the resilient O ring, but the valve member is immediately followed by the guard member 23. Thus as the valve member is retracted from the throat orifice the guard ring moves into protective relation with respect to the groove 18 and the resilient O ring 19. Immediately after the valve member 20 leaves sealing engagement with the O ring 19 some flow may occur through the small clearance between the outer periphery of the valve member and the inner periphery of the seat, although this flow is relatively restricted. However, as the valve member is retracted completely from the orifice the effective flow area is increased rapidly, until full open position is reached. Normal flow under such conditions occurs through the openings or ports between the webs 27, and this effective flow area is proportioned to suit the requirements of the valve.

Assuming that inlet pressure is applied to passage 11, it will be evident that for the closed position illustrated in Figures 1 and 2, inlet pressure acts downwardly upon the rod 24 to tend to move the guard ring 23 downwardly against the spring 28. Therefore if inlet pressure is to be applied to the passage 11, spring 28 should be sufficiently strong to resist the inlet pressure. When passage 12 is made the inlet, fluid pressure acts in conjunction with the compression spring 28 to urge the guard ring against the valve member.

It will be evident that we have provided a valve suitable for a wide variety of industrial applications. The O ring is protected against dislodgment and the valve is therefore applicable to relatively high fluid pressures of the order of 2000 p. s. i. or more.

We claim:

1. In a fluid control valve, a valve body having flow passages, an annular seat member formed within the body and providing a cylindrical throat orifice serving to connect the inflow and outflow passages, a valve stem slidably extended into the body in axial alignment with the axis of the throat orifice, an annular groove serving to interrupt the inner peripheral surface of the throat orifice, a resilient seal ring loosely disposed within said groove, and a valve assembly carried by the inner end of said stem and adapted to be moved between full open and closed positions with respect to the seat member, said valve assembly including a member having a cylindrical outer periphery and adapted to fit within the throat orifice for full closed position of the valve assembly and to be retracted from the throat orifice in spaced relation to the seat member for full open position of the valve assembly, a guard member having an outer cylindrical periphery of the same diameter as the cylindrical periphery of said valve member, said guard member being ported for flow of fluid therethrough, a rod slidably extended through said valve member, the guard member being attached to one end of said rod and being disposed adjacent that side of the valve member remote from the valve stem, spring means disposed to act between the valve member and the rod to normally urge the guard member against said last mentioned side of the valve member, whereby the outer cylindrical peripheries of the valve and guard members are contiguous, and means for arresting movement of the guard member whereby when the valve assembly is moved to full open position, following movement of the guard member with respect to the valve member is arrested to retain the guard member within the throat orifice and in a position to retain the seal ring within said groove, and means for maintaining a fluid tight seal between said valve member and said rod.

2. In a fluid flow control valve, a valve body having flow passages, an annular seat member formed in the body and providing a cylindrical throat orifice for flow of fluid between said passages, a valve member carried by the body and movable in opposite directions between open and closed positions with respect to the valve seat, said valve member having a cylindrical portion formed to fit within the cylindrical throat orifice, a rod slidably extended through the valve member, means for establishing a fluid tight seal effective to prevent leakage between the rod and the valve member, an annular guard member attached to one end of the rod on one side of the valve member, means for limiting sliding movement of the rod relative to the valve member, spring means for urging the rod in a direction to urge the guard member toward the valve member, said guard member having an outer cylindrical periphery which is substantially the same diameter as the cylindrical portion of the valve member, a groove interrupting the inner peripheral surface of the seat member, a resilient seal ring loosely disposed within said groove, said seal ring being compressed in a radial direction when said valve member is within the throat orifice to effect a seal between the seat member and the valve member, said guard member having a port therethrough for flow of fluid, and means including a shoulder carried by the valve body and serving to arrest movement of the guard member with respect to the valve member whereby when said valve member is moved to full open position, said guard member remains positioned within said throat orifice in protective engagement with said seal ring.

3. A fluid control valve as in claim 1 in which the stem is hollow and in which the rod extends through the stem.

MARVIN H. GROVE.
AUSTIN U. BRYANT.

References Cited in the file of this patent
UNITED STATES PATENTS

| Number | Name | Date |
|---|---|---|
| 969,803 | Pollock | Sept. 13, 1910 |
| 2,469,921 | Hoge | May 10, 1949 |